(12) United States Patent
Mantovani

(10) Patent No.: US 7,105,965 B2
(45) Date of Patent: Sep. 12, 2006

(54) ELECTRIC MOTOR WITH THE ROTOR CONNECTED TO THE MEMBER THAT IS TO BE ROTATED

(76) Inventor: Sascha Mantovani, Via Camara 46, Breganzona (CH) 6932

( * ) Notice: Subject to any disclaimer, the term of this patent is extended or adjusted under 35 U.S.C. 154(b) by 0 days.

(21) Appl. No.: 10/498,898

(22) PCT Filed: Dec. 27, 2002

(86) PCT No.: PCT/IB02/05636
§ 371 (c)(1),
(2), (4) Date: Jun. 16, 2004

(87) PCT Pub. No.: WO03/055712
PCT Pub. Date: Jul. 10, 2003

(65) Prior Publication Data
US 2005/0104472 A1    May 19, 2005

(30) Foreign Application Priority Data
Jan. 4, 2002    (CH) .................................... 0015/02

(51) Int. Cl.
*H02K 7/02*    (2006.01)

(52) U.S. Cl. .................. 310/75 C; 310/75 D; 180/65.5
(58) Field of Classification Search ............. 310/75 C, 310/75 D, 67 A, 266, 90; 180/65.1–65.6
See application file for complete search history.

(56) References Cited

U.S. PATENT DOCUMENTS

| | | | | |
|---|---|---|---|---|
| 2,505,770 A | * | 5/1950 | Hill | 244/103 S |
| 3,462,626 A | * | 8/1969 | Kluss | 310/114 |
| 5,322,141 A | * | 6/1994 | Brunner et al. | 180/65.5 |
| 5,382,854 A | * | 1/1995 | Kawamoto | 310/67 R |
| 5,450,915 A | * | 9/1995 | Li | 180/65.5 |

* cited by examiner

*Primary Examiner*—Dang Le
(74) *Attorney, Agent, or Firm*—Young & Thompson

(57) ABSTRACT

In an electric motor having a rotor (2) and, coaxial therewith, a stator (1), both contained in a frame (3), the motor being capable of rotating a member (4) about an axis of rotation coinciding with the axes of the rotor (2) and stator (1), the rotor (2) is connected in rotation to the member (4), is hollow and its interior houses a shaft (5) that supports both it (2) and the member (4), and the frame (3) of the motor is supported by the same shaft (5) and is connected by an attachment (6) to a structure that does not participate in the rotation.

4 Claims, 3 Drawing Sheets

ELECTRIC MOTOR WITH THE ROTOR CONNECTED TO THE MEMBER THAT IS TO BE ROTATED

BACKGROUND OF THE INVENTION

The present invention relates to electric motors comprising a rotor and a stator both contained in a frame and using electrical energy to rotate a member connected to them.

DESCRIPTION OF THE RELATED ART

Usually (as in a motor-driven rotary pump), the rotor of a motor of this type is integral with a coaxial shaft, to which it transmits the driving torque, and only one end of the shaft projects out of the frame.

However, this type of motor has serious limitations in its modes of use owing to the fact that it has to be mounted in the way hinted at above.

To take one example, in self-propulsion the fact that the shaft driven by the electric motor projects from one side only makes it impossible to mount it directly on the axles of the drive wheels. A transmission system must therefore be used to transmit the rotation of the motor to the axles themselves.

This creates problems in terms of the manufacturing cost, space requirements, the inevitable energy losses and imprecision in the transmission of the drive.

SUMMARY OF THE INVENTION

The inventor of the present innovation has provided a solution to this problem by devising a motor which, while comprising the same essential parts (rotor, stator and frame) as electric motors of known type, can be mounted in a very much more advantageous way owing to the particular arrangement of its parts and their connections.

The electric motor according to the invention is characterized in that the rotor is connected in rotation to the said member, is hollow and its interior houses a shaft that acts as a support for the rotor, for the member and for the frame, the frame being connected by means of attachment to a structure that does not participate in the rotation of the said member.

DESCRIPTION OF THE PREFERRED EMBODIMENTS

Figure 1:
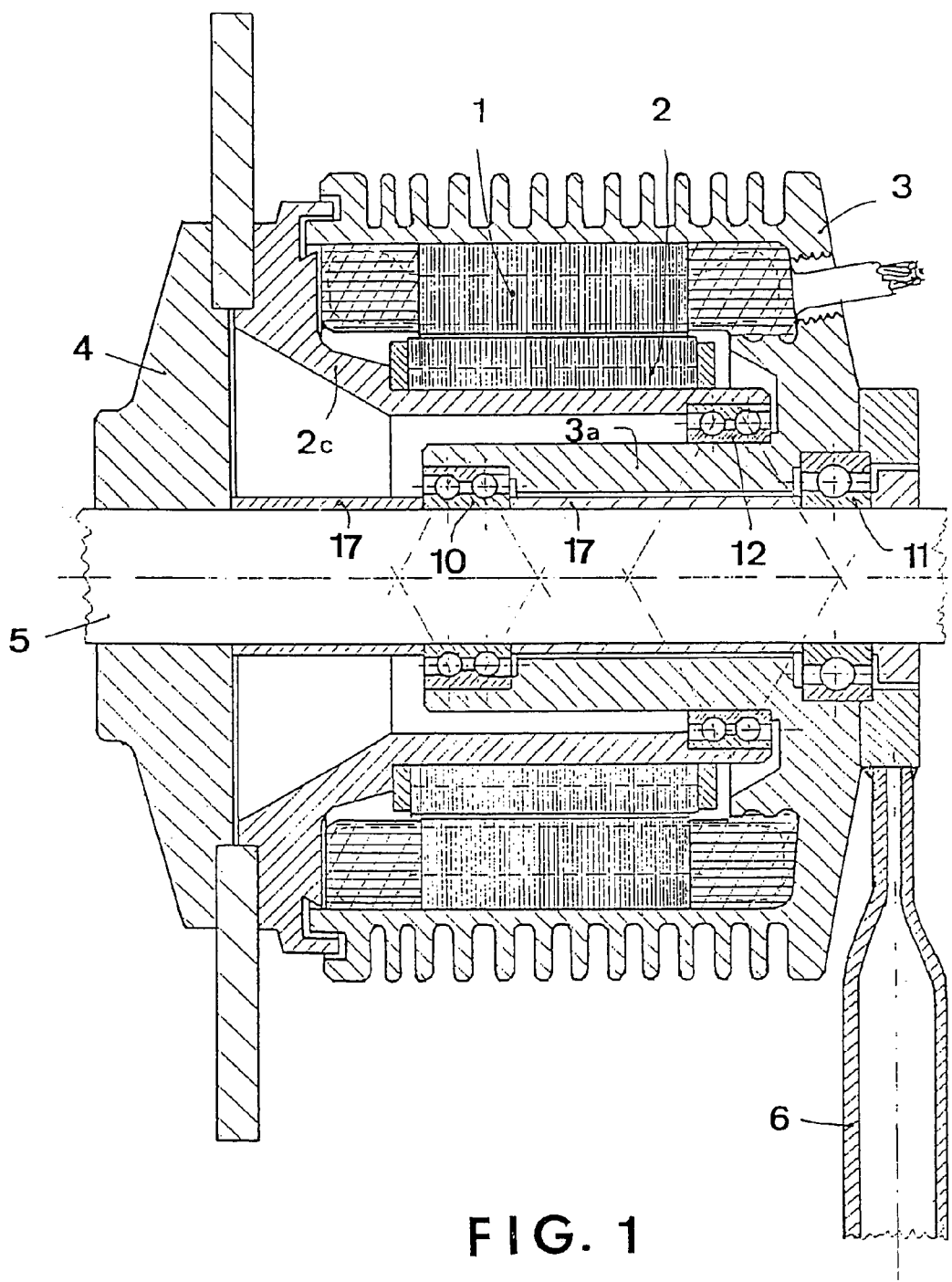
Figure 2:
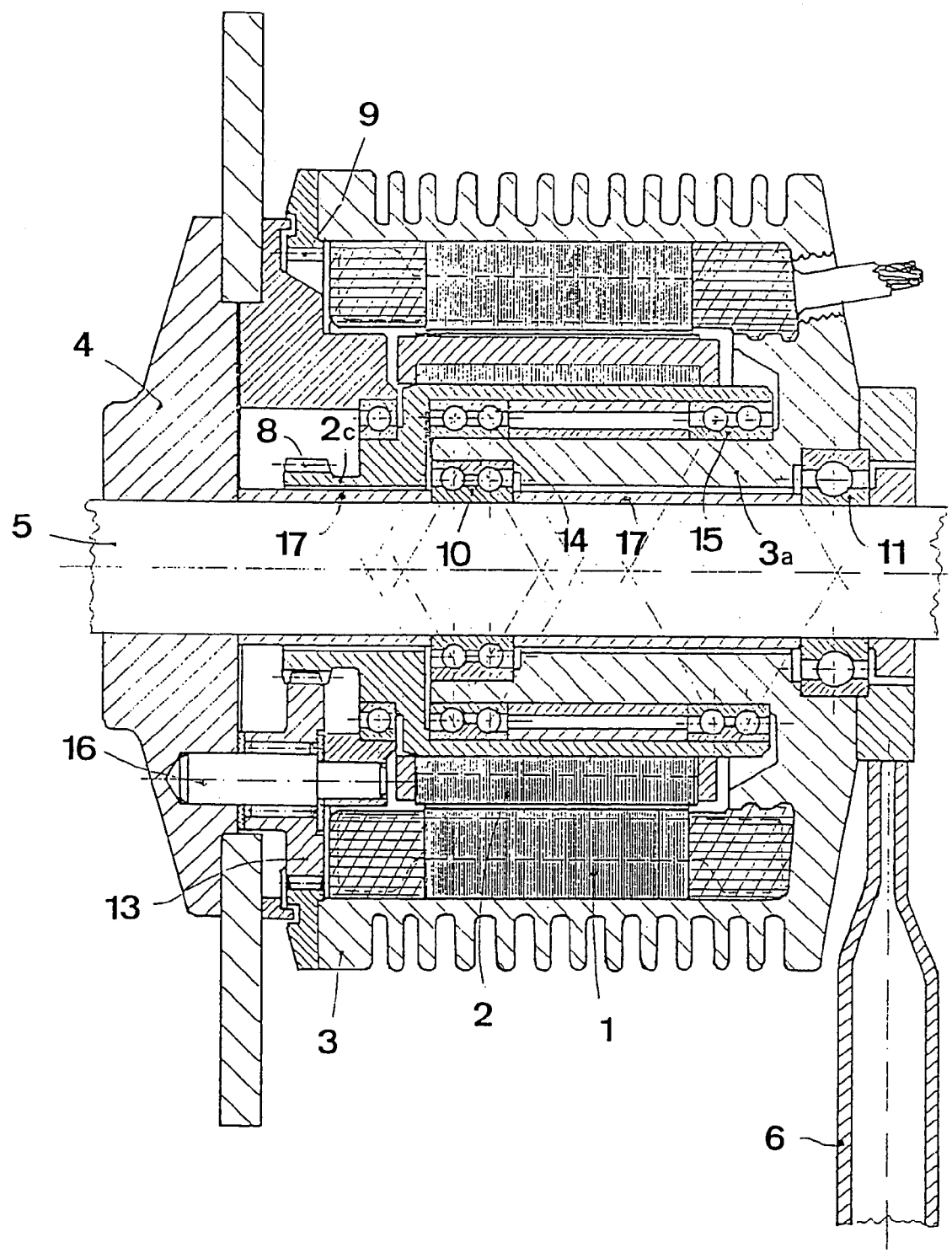
Figure 3:
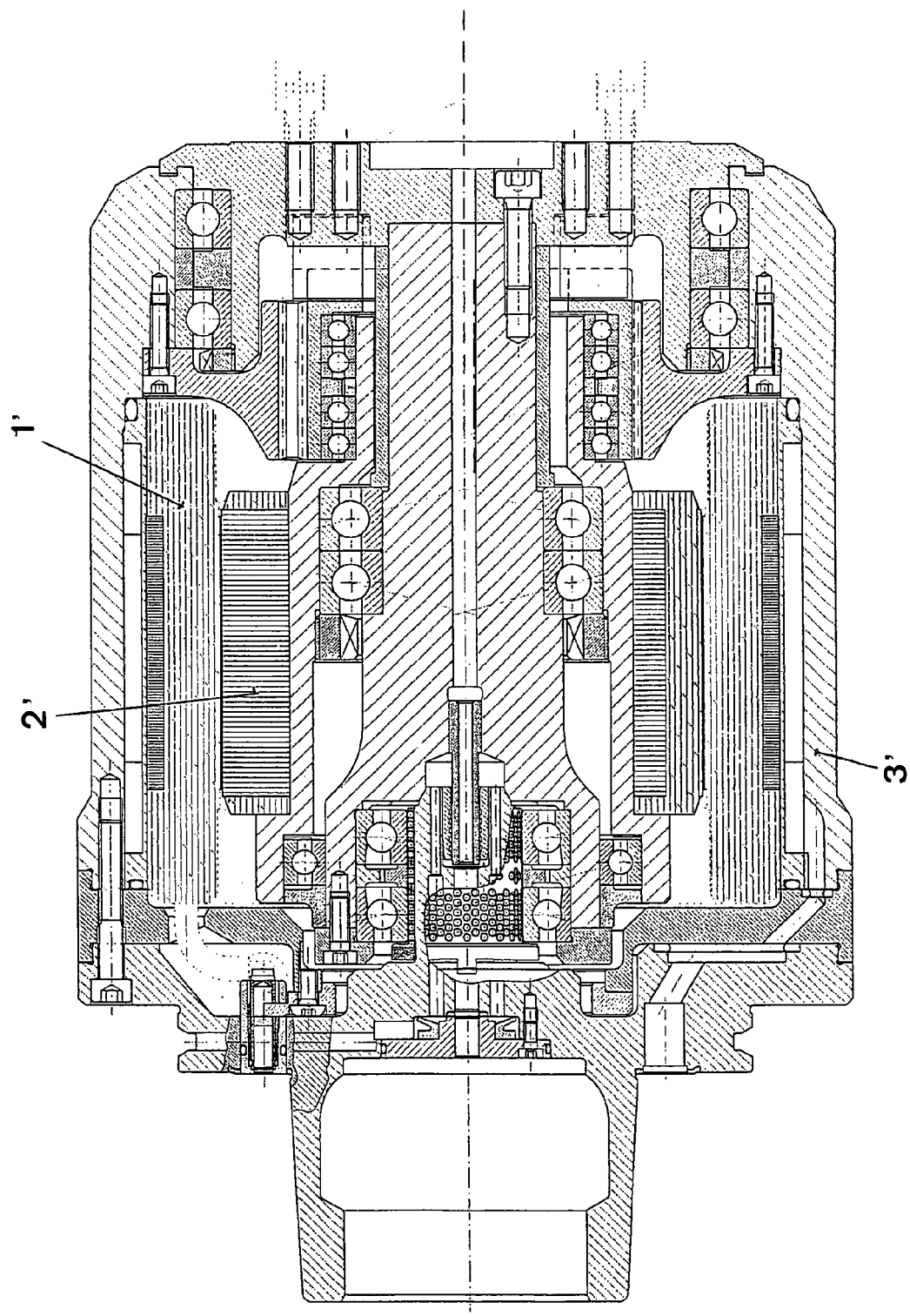

Two preferred embodiments suitable for self-propulsion applications will now be described in more detail by way of example, no limitation or restriction therefore being implied, for which purpose reference will also be made to the accompanying drawings, in which:

FIG. 1 is a view in longitudinal section of a preferred embodiment of the electric motor according to the invention connected to the hub of a wheel in the case in which a part of the rotor is directly fixed to the hub, while FIG. 2 shows the case in which this part is connected to the hub via intermediate speed-reducing gearing, and FIG. 3 shows a longitudinal section through a spindle powered by the electric motor of the invention.

Referring to FIG. 1, it can be seen that the frame 3 is supported by a cylindrical shaft 5 via rolling bearings 10, 11. To keep the frame 3 stationary, it is connected to a rod 6, which may also be provided with joints or damping elastic supports (not shown) and the rod in turn is fixed to a part of the frame of the vehicle (not shown) on which the motor is installed.

A stator 1 is made integral with the frame 3 by systems known to those skilled in the art, and its interior coaxially houses the stator 1, which is also of known type.

Mounted internally and also coaxially with the latter is the rotor 2, which also includes a suitably shaped part 2c projecting from the frame 3 where it is fixed to the hub 4 of a wheel of the vehicle, which is therefore integral with the rotor 2 in rotation. Lastly, situated coaxially even nearer the centre is a support member 3a integral with the frame which may also be, as in the case depicted, a part of the frame 3 itself, so that the hub 4 can be clamped following interposition of the abovementioned rolling bears 10, 11 with suitable distance rings 17.

Another rolling bearing 12 (or more than one to reduce the radial thickness from the same load) is inserted lastly between the rotor 2 and the support member 3a to enable the rotor 2 to be supported without preventing its relative rotation.

As can be seen in FIG. 1, the electric motor mounted on the shaft 5 which supports the member 3a and the frame 3 is compact and takes up very little space.

The shaft 5 coupled to the electric motor in the embodiments according to the invention functions also as a member that connects and distributes the load between the wheels of one axle, while the rotation is transmitted to the wheels directly by the motors connected to them, it being obvious that one electric motor according to the invention can be fitted for each wheel, that is at both ends of the shaft, resulting in great functionality and ease of assembly and operation.

FIG. 2 meanwhile shows a solution for those cases in which speed reduction is required between the motor and the wheel, that is to say that the wheel is to have a smaller angular velocity than the electric motor connected to it.

The frame 3, stator 1 and rotor 2 are installed as already described in the previous case, but the part 2c of the rotor 2 projecting from the frame 3 is not now shaped in such a way as to be fixed to the hub 4, but instead includes a first ring gear 8 that meshes with a gear wheel 13 pivoted on a spindle 16 integral with the hub 4, this gearwheel 13 meshing in turn with a second ring gear 9 formed on the frame 3.

Rotation of the said projecting part 2c of the rotor 2 and of its first ring gear 8 produces rotation of the gear wheel 13, which is connected to the hub 4, and its revolution about the shaft 5 along the second ring gear 9 with a speed of rotation equal to the speed of rotation of the rotor 2 divided by the ratio of the number of teeth of the second ring gear 9 to that of the first ring gear 8. With appropriate numbers of teeth, the speed of rotation of the hub 4 is equal to the said speed of revolution of the gearwheel 13, and is therefore the required amount less than that of the rotor 2.

FIG. 3 meanwhile shows a spindle driven by an electric motor produced in accordance with the invention comprising a rotor 2' and a stator 1'. This type of application shows very clearly the above-described advantages provided by the invention, such as in particular the small size of the electric motor, and hence of course of the spindle itself, the outer casing of which acts as a frame 3'.

The type of electric motor may be selected on the basis of the preferences of the designers, but the inventor suggests using an asynchronous motor supplied by a high-frequency converter.

It will be obvious that the shape and relative disposition of the parts may be modified by a person skilled in the art depending on particular requirements, but the resulting embodiments, if derivable from the content of the appended claims, will still lie within the scope of protection conferred by the present patent application.

The embodiments described above and illustrated must not therefore be regarded as compulsory or limiting.

The invention claimed is:

1. An electric motor, comprising:
   a rotating cylindrical shaft (5);
   a frame (3) supported by the shaft (5) via roller bearings (10, 11) and comprising, as a single continuous piece, an outer portion and an inner support member (3a);
   an attachment (6) connected to the frame and extending away from the shaft to a vehicle frame part, the attachment keeping the frame stationary;
   a stator (1) integral with the frame (3) and radially interior to the frame;
   a rotor (2) mounted interior to the stator and the outer portion of the frame;
   a projecting part of the rotor (2c) projecting, in both an axial direction and a radial direction, outside the stator (1), the rotor and the projecting part being a single continuous piece;
   a vehicle hub (4) fixed to the projecting part of the rotor and rotationally integral with the rotor, wherein,
   the support member (3a) is supported via the rolling bearings (10, 11) on the shaft,
   the rotor is radially intermediate the inner, support member and the outer portion of the frame; and
   distance rings (17) located axially between the hub and a closest one of the rolling bearings (10), the distance rings clamping the hub.

2. The motor of claim 1, wherein, the attachment is a rod extending radially outward from the shaft.

3. The motor of claim 2, further comprising rolling bearing (12) mounted on the support member and supporting the rotor.

4. The motor of claim 1, wherein a radially outermost portion of the project part of the rotor extends axially into an outer groove of the frame.

* * * * *